UNITED STATES PATENT OFFICE.

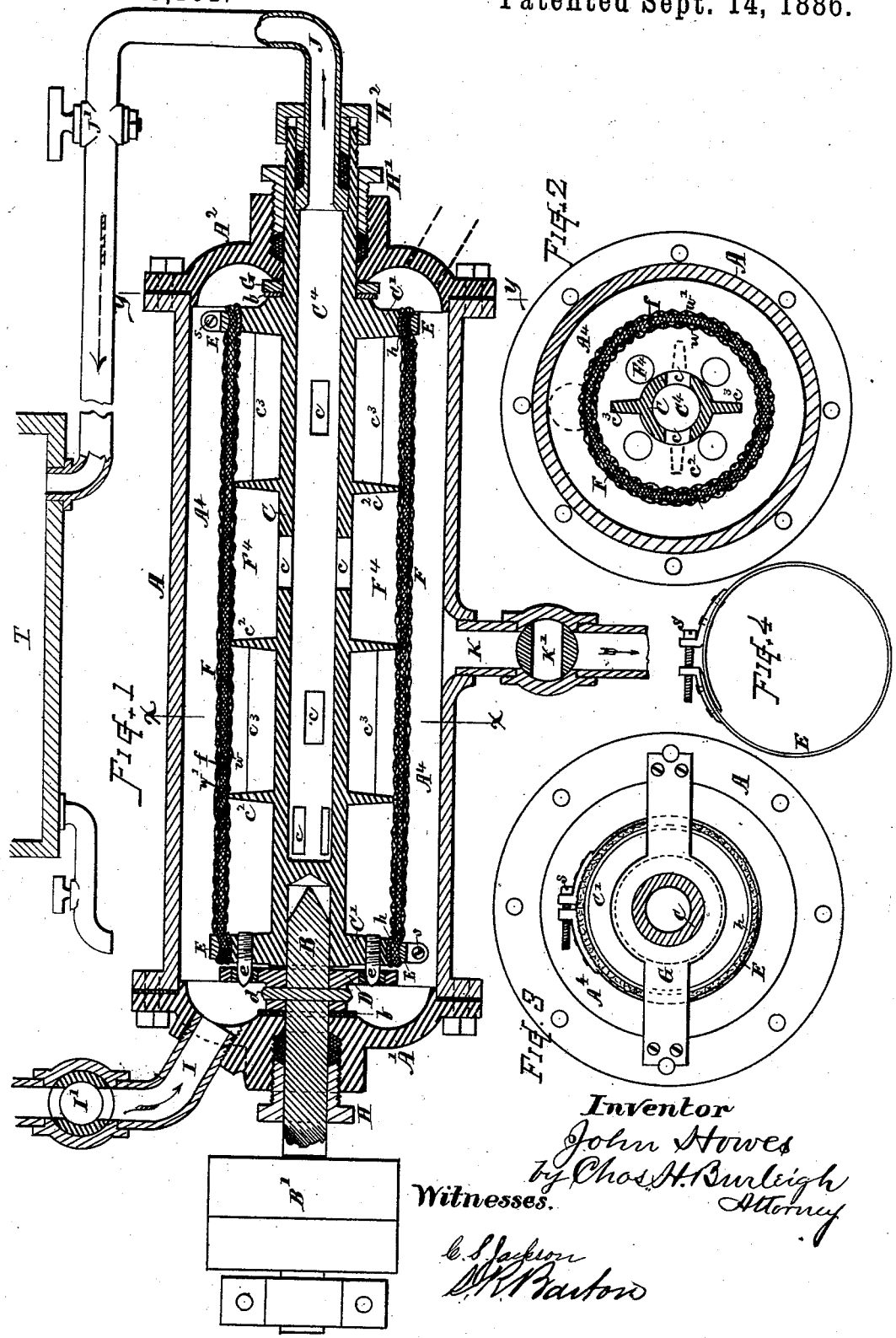

JOHN HOWES, OF WORCESTER, MASSACHUSETTS.

FILTERING APPARATUS.

SPECIFICATION forming part of Letters Patent No. 349,101, dated September 14, 1886.

Application filed July 25, 1885. Serial No. 172,599. (No model.)

*To all whom it may concern:*

Be it known that I, JOHN HOWES, a citizen of the United States, residing at Worcester, in the county of Worcester and State of Massachusetts, have invented certain new and useful Improvements in Filtering Apparatus; and I declare the following to be a description of my said invention sufficiently full, clear, and exact to enable others skilled in the art to which it appertains to make and use the same, reference being had to the accompanying drawings, which form a part of this specification.

The object of my present invention is to provide a filtering apparatus of improved construction in which the filtering-surface may be revolved within the inclosing case or cylinder by conveniently-applied power, to facilitate the cleansing or removal of deposited sediment from said surface.

My invention consists in a filter organized for operation as illustrated and described, and in the constructive features and details, as more particularly and definitely hereinafter specified.

In the drawings, Figure 1 is a longitudinal central section of a filtering apparatus, illustrating the nature of my invention. Fig. 2 is a transverse section of the same at the line $x$ $x$. Fig. 3 is a sectional view at the line $y$ $y$, showing the manner of supporting the filter-core; and Fig. 4 is a side view of the clamp for securing the felt to the core.

In reference to parts, A denotes the case or main cylinder, which may be of any desired size in diameter and length. (As shown in the present drawings, the length is somewhat less in proportion to the diameter than would ordinarily be used in practice, the limit of the drawing-sheet rendering it more convenient to show it thus shortened.)

A' and $A^2$ indicate the heads for closing the ends of cylinder A, secured thereto by screw-bolts or other suitable fastenings.

B indicates a center arbor or spindle journaled in the head A', and provided with suitable gears or pulleys, B', for effecting rotation of said arbor and parts connected therewith.

C indicates a tubular shaft or hollow core having passages $c$ from the exterior to its interior, and provided with heads C' and annular flanges $c^2$, for supporting the filtering material. Longitudinal flanges or ribs $c^3$ may also be formed on the exterior of the core, as indicated. This core is journaled at one end in the head $A^2$, and at its other end is connected with the arbor B, for support and rotation therewith, preferably by a detachable connection.

D indicates a disk or plate arranged on the spindle or arbor B, and fixed to revolve therewith by a key or pin, $d$. The plate D is provided with recesses or holes that engage with pins $e$, that are fixed in the head of the core-shaft $c$, so that said core will revolve with the action of the arbor.

F indicates the filtering material disposed as a cylinder or covering about the supporting-core C and its flanges $c^2$, and consisting of a tube or cylinder preferably of felt, $f$, supported by an outer and inner guard-cylinder of wire-netting, as $w$ $w'$, or equivalent construction—as, for instance, of hexagonal or octagonal shape, instead of circular, and with a woven fabric, paper, or other suitable substance in lieu of felt, or with perforated metal instead of wire-netting at $w$ $w'$.

The ends of the tube or filter-felt F are each firmly secured to the peripheries of the core-heads C' by means of clamping hoops or bands E, (see Fig. 4,) which pass around the ends of the filter, and are tightened thereon by the screw $s$. A packing, $h$, may be used under the ends of the filter, if desired.

G indicates a bar or plate arranged across the end of the main cylinder A, for supporting the C core when the head $A^2$ is removed.

Suitable stuffing-boxes, H H', are provided on the heads A' $A^2$, for packing the bearing-joints. Brass washers $b$ $b$ may be introduced to take the endwise wear of the moving parts, as indicated.

I indicates the inlet or supply pipe, through which the water enters the chamber $A^4$, and I' is the stop-cock for closing said inlet.

J is the delivery-pipe, through which the filtered water is conveyed from the tube $c^4$ and chamber $F^4$ within the filter F to a suitable storage-tank, T, or to the place of its delivery for use. The pipe J is fitted to the end of the core or shaft C, which forms the axial delivery for filtrate by a turning joint, and a suitable stuffing-box, $H^2$, is provided to make a tight connection, while permitting the rotation of the shaft. A cock, J', may be provided in said pipe J.

K denotes the waste-outlet, and k' the cock for removing the sediment from the chamber A⁴. Said outlet is preferably located in the side of the cylinder when the apparatus is used in a horizontal position; but in case the apparatus is for use in upright position said outlet may be made at one or the other of the ends, as indicated by dotted lines, as K².

The end of the arbor B enters and centers the core C, and this, together with the pins e, forms a connection that may be easily detached, so that the filtration-cylinder F and its support-core c can be withdrawn from the main cylinder or case A when desired. In filters of large size, to withdraw this cylinder F when the apparatus is in a horizontal position, the head A² is first removed, the end of the core being supported by the bar G. A board or guide is then inserted into cylinder A, beneath the cylinder F, after which the bar G is removed and the cylinder F drawn out along the board or guide. For again replacing the cylinder F, this operation is reversed.

In the operation of this filtering apparatus the water or other liquid, under some degree of pressure, enters the chamber A⁴ from the pipe I, passing through the filtration-cylinder F to chamber F', and from thence by way of passages c, hollow c', and pipe J to the storage-tank T or place of delivery, the sediment being deposited on the exterior of the filtration-cylinder F. To cleanse the filter the core C and filter F are revolved rapidly by power applied to the spindle B, while the discharge-cock K' is open, and with either of the cocks I' and J' open, closed, or partially closed to a greater or less degree, as desired. The longitudinal ribs c³ insure motion of the liquid within the chamber F' as the filter is revolved and develops considerable centrifugal force, which, in connection with the backward flow of liquid through the axial passage and filter from the storage-tank, which is preferably located above the level of the filter, serves to loosen and wash off the mud or sediment lodged on the surface of the felt F.

This filtering apparatus is adapted for large works and factories; but it may be also made in small sizes, and the arbor B be arranged to be revolved by hand-power as well as by machinery.

I am aware that filtering apparatus has heretofore been patented in which the filter could be revolved, and I do not, therefore, herein broadly claim a revoluble filter irrespective of construction.

What I claim as of my invention, to be secured by Letters Patent, is—

1. In a filtering apparatus, the combination, substantially as described, of the hollow revoluble core C, having heads C', annular flanges c², radial longitudinal flanges c³, and openings c, the tubular filtering material F, and connecting-bands E, for the purpose set forth.

2. The combination, substantially as hereinbefore described, of the casing-cylinder, the revoluble driving-arbor B, journaled in the head A', and having an inward-projecting end provided with the plate D, keyed thereto, and the filtering-cylinder mounted on the revoluble hollow core-shaft C, one end of which is journaled in the head A², the other end thereof being centered and supported by said arbor B, and detachably connected for motion therewith by pins e, fixed in the core-head C and entering holes in said plate D, in the manner and for the purpose set forth.

3. The combination, with the casing A, its head A², and revoluble filter-cylinder, one end of which is journaled in said head and the other end detachably supported on the arbor B, of the bearing-bar G, for sustaining said filter-cylinder when the head A² is removed, substantially as shown and described.

Witness my hand this 22d day of April, A. D. 1885.

JOHN HOWES.

Witnesses:
CHAS. H. BURLEIGH,
GEO. M. RICE.